(12) United States Patent
Kim et al.

(10) Patent No.: US 9,167,258 B2
(45) Date of Patent: Oct. 20, 2015

(54) FAST MODE DETERMINING METHOD AND APPARATUS IN SCALABLE VIDEO CODING

(75) Inventors: Tae Jung Kim, Cheongju-si Chungbuk (KR); Chang Ki Kim, Daejeon-si (KR); Jeong Ju Yoo, Daejeon-si (KR); Young Ho Jeong, Daejeon-si (KR); Jin Woo Hong, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 572 days.

(21) Appl. No.: 13/554,643

(22) Filed: Jul. 20, 2012

(65) Prior Publication Data

US 2013/0188690 A1  Jul. 25, 2013

(30) Foreign Application Priority Data

Jan. 19, 2012  (KR) .................. 10-2012-0005974

(51) Int. Cl.
*H04N 7/26* (2006.01)
*H04N 19/33* (2014.01)
*H04N 19/159* (2014.01)
*H04N 19/176* (2014.01)
*H04N 19/147* (2014.01)
*H04N 19/109* (2014.01)
*H04N 19/157* (2014.01)
*H04N 19/187* (2014.01)

(52) U.S. Cl.
CPC ............. *H04N 19/33* (2014.11); *H04N 19/109* (2014.11); *H04N 19/147* (2014.11); *H04N 19/157* (2014.11); *H04N 19/159* (2014.11); *H04N 19/176* (2014.11); *H04N 19/187* (2014.11)

(58) Field of Classification Search
CPC ....................................... H04N 19/33
USPC .................................... 375/240.03
IPC ....................................... H04N 7/26
See application file for complete search history.

(56) References Cited

U.S. PATENT DOCUMENTS

2005/0152452 A1*  7/2005  Suzuki ............... 375/240.16
2010/0329342 A1* 12/2010  Joshi et al. ............ 375/240.16
2014/0003495 A1*  1/2014  Chuang et al. ......... 375/240.02

* cited by examiner

*Primary Examiner* — Richard Torrente
*Assistant Examiner* — Yulin Sun
(74) *Attorney, Agent, or Firm* — William Park & Associates Ltd.

(57) ABSTRACT

A prediction mode determining method in scalable video coding based on a structure of multiple layers is provided. The prediction mode determining method includes: deriving a coded block pattern (CBP) value of a luma component for a 16×16 mode of an encoding target picture; determining first candidate modes for the encoding target picture according to the derived CPB value; and determining a final prediction mode for the encoding target picture based on the determined first candidate modes. According to the present invention, encoding efficiency may be improved, and complexity may be reduced.

6 Claims, 9 Drawing Sheets

FAST MODE DETERMINING METHOD AND APPARATUS IN SCALABLE VIDEO CODING

CROSS-REFERENCE TO RELATED APPLICATIONS

This application claims the benefit of priority of Korean Patent Application No. 10-2012-0005974 filed on Jan. 19, 2012, which is incorporated by reference in their entirety herein.

BACKGROUND OF THE INVENTION

1. Field of the Invention

The present invention relates to video processing, and more particularly, to a scalable video coding method and apparatus 2. Related Art Recently, in accordance with the development of a network and the activation of various multimedia services, a broadband convergence network (BcN) and a communication and broadcasting convergence infrastructure have been introduced and generation, transmission, and consumption environments of a digital multimedia have been rapidly changed. In accordance with this change, video application devices such as a HDTV, a UHDTV, a smart phone, an IPTV, a 3DTV, a digital theater, an AT-DMB, and the like, have exponentially increased. In most of the multimedia service schemes that is currently being provided, data compressed according to an environment determined in advance is used in consideration of a transmission environment and user terminal performance. However, in a digital convergence environment that has been gradually generalized, a technology of providing contents so as to be adaptive to a transmission environment, a storing system, and a user terminal has been demanded.

The video coding experts group (VCEG) of the ITU-T and the moving picture experts group (MPEG) of the ISO/IEC have standardized the scalable video coding (SVC). The SVC may also be called scalable video coding. However, in order to compress video data applied to a network environment in which a bandwidth is frequently changed, a new compression technology is required. To this end, a scalable video coding method may be used.

SUMMARY OF THE INVENTION

The present invention provides a scalable video coding method and apparatus capable of improving encoding efficiency and reducing complexity.

The present invention also provides a prediction mode determining method and apparatus capable of improving encoding efficiency and reducing complexity.

1. In an aspect, a prediction mode determining method in scalable video coding based on a structure of multiple layers is provided. The prediction mode determining method includes: deriving a coded block pattern (CBP) value of a luma component for a 16×16 mode of an encoding target picture; determining first candidate modes for the encoding target picture according to the derived CPB value; and determining a final prediction mode for the encoding target picture based on the determined first candidate modes, wherein the encoding target picture is a B picture in an enhancement layer.

2. In 1, in the determining of the first candidate modes, the first candidate modes may be determined as a first class in the case in which the derived CBP value is 0, and the first candidate modes may be determined as a second class in the case in which the derived CBP value is not 0, wherein the first class includes a SKIP mode, a 16×8 mode, and a 8×16 mode, and the second class includes a SKIP mode, a 16×8 mode, and a 8×16 mode, and a SUB 8×8 mode.

3. In 2, the determining of the final prediction mode may include: determining a reference picture for the encoding target picture; determining a second candidate mode (or second candidate modes) for the encoding target picture using information on the determined reference picture; and determining the final prediction mode among the determined second candidate mode (s).

4. In 3, the structure of the multiple layers may be a spatial layer structure or a picture quality layer structure, and in the determining of the reference picture, the reference picture may be determined based on a difference value between a quantization to parameter value of a base layer and a quantization parameter value of the enhancement layer.

5. In 4, in the determining of the reference picture, a picture of the base layer may be determined as the reference picture in the case in which the difference value between the quantization parameter value of the base layer and the quantization parameter value of the enhancement layer is smaller than 4.

6. In 3, the structure of the multiple layers may be a temporal layer structure, and in the determining of the reference picture, a picture of a temporal lower level may be determined as the reference picture.

7. In 3, the structure of the multiple layers may be a combined layer structure, and in the determining of the reference picture, a picture of a base layer that is referenced may be determined as the reference picture in the case in which the encoding target picture has the base layer that is referenced, and a picture of a temporal lower level may be determined as the reference picture in the case in which the encoding target picture does not have the base layer that is referenced.

8. In 3, the structure of the multiple layers may be a spatial layer structure or a picture quality layer structure, and in the determining of the second candidate mode (s), the second candidate mode (s) may be determined using a CBP value of a luma component of a reference block, wherein the reference block is a block corresponding to an encoding target block among blocks in the reference picture.

9. In 8, in the determining of the second candidate mode (s), a SKIP mode and a 16×16 mode may be determined as the second candidate modes in the case in which the first candidate modes are determined as the first class, the CBP value of the luma component of the reference block is 0, and a prediction mode of the reference block is the SKIP mode or the 16×16 mode.

10. In 8, in the determining of the second candidate mode (s), a SKIP mode and a SUB8×8 mode may be determined as the second candidate modes in the case in which the first candidate modes are determined as the second class, the CBP value of the luma component of the reference block is 7, 11, 13, or 14, and a prediction mode of the reference block is the SUB8×8 mode.

11. In 3, the structure of the multiple layers may be a temporal layer structure, and in the determining of the second candidate mode (s), a SKIP mode and a 16×16 mode may be determined as the second candidate modes in the case in which the first candidate modes are determined as the first class and a prediction mode of a reference block is the SKIP mode or the 16×16 mode, wherein the reference block is a block corresponding to an encoding target block among blocks in the reference picture.

12. In 3, the structure of the multiple layers may be a temporal layer structure, and in the determining of the second candidate mode (s), a SKIP mode and a SUB8×8 mode may be determined as the second candidate modes in the case in which the first candidate modes are determined as the second class and a prediction mode of a reference block is the SUB8×8 mode, wherein the reference block is a block corresponding to an encoding target block among blocks in the reference picture.

13. In 3, the structure of the multiple layers may be a combined layer structure, and in the determining of the second candidate mode (s), the second candidate modes may be determined as the first class in the case in which the reference picture is a picture of a base layer and the first candidate modes are determined as the first class.

14. In 3, the structure of the multiple layers may be a combined layer structure, and in the determining of the second candidate mode (s), a SKIP mode and a SUB8×8 mode may be determined as the second candidate modes in the case in which the reference picture is a picture of a base layer, the first candidate modes are determined as the second to class, and a CBP value of a luma component of a reference block is 7, 11, 13, or 14, wherein the reference block is a block corresponding to an encoding target block among blocks in the reference picture.

15. In 3, the structure of the multiple layers may be a combined layer structure, and in the determining of the second candidate mode (s), a SKIP mode may be determined as the second candidate mode in the case in which the reference picture is a picture of a temporal lower level, the first candidate modes are determined as the first class, and a CBP value of a luma component of a reference block is 0, wherein the reference block is a block corresponding to an encoding target block among blocks in the reference picture.

16. In 3, wherein the structure of the multiple layers may be a combined layer structure, and in the determining of the second candidate mode (s), the second candidate modes may be determined as the second class in the case in which the reference picture is a picture of a temporal lower level and the first candidate modes are determined as the second class.

17. In 3, the determining of the final prediction mode may further include: deriving rate-distortion values for each of the second candidate mode (s); and determining the final prediction mode based on the derived rate-distortion values.

18. In another aspect, a scalable video coding method based on a structure of multiple layers is provided. The scalable video coding method includes: deriving a CBP value of a luma component for a 16×16 mode of an encoding target picture; determining first candidate modes for the encoding target picture according to the derived CPB value; determining a final prediction mode for the encoding target picture based on the determined first candidate modes; and encoding the encoding target picture based on the determined final prediction mode, wherein the encoding target picture is a B picture in an enhancement layer.

DESCRIPTION OF EXEMPLARY EMBODIMENTS

Hereinafter, exemplary embodiments of the present invention will be described in detail with reference to the accompanying drawings. In describing exemplary to embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention.

Furthermore, constitutional parts shown in the embodiments of the present invention are independently shown so as to represent different characteristic functions. Thus, it does not mean that each constitutional part is constituted in a constitutional unit of separated hardware or one software. In other words, each constitutional part includes each of enumerated constitutional parts for convenience of explanation. Thus, at least two constitutional parts of each constitutional part may be combined to form one constitutional part or one constitutional part may be divided into a plurality of constitutional parts to perform each function. The embodiment where each constitutional part is combined and to the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
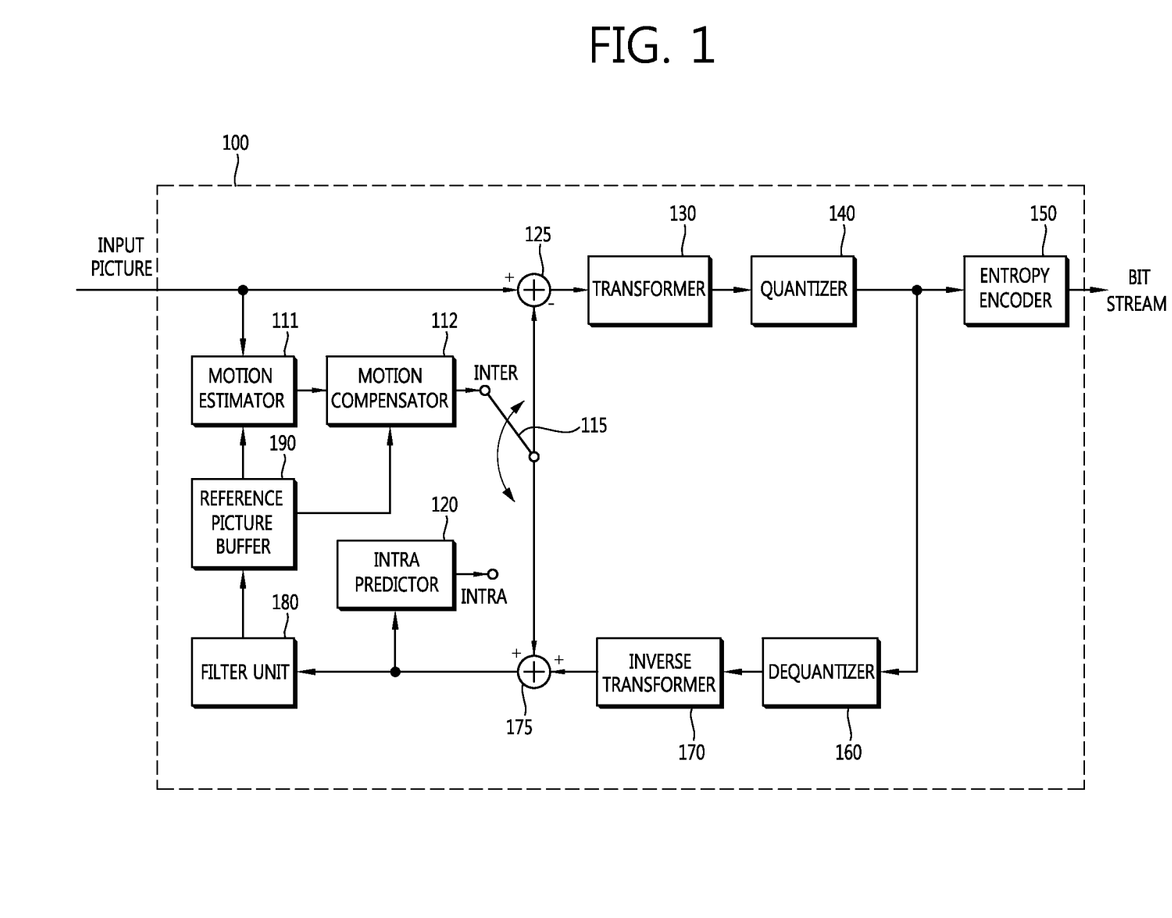
FIG. 1 is a block diagram showing a configuration of a video encoding apparatus according to an exemplary embodiment of the present invention.

FIG. 1 is a block diagram showing a configuration of a video encoding apparatus according to an exemplary embodiment of the present invention.

Referring to FIG. 1, a video encoding apparatus 100 may include a motion estimator 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference picture buffer 190.

The video encoding apparatus 100 may perform encoding on input pictures in an intra-mode or an inter-mode and output bit streams. The intra prediction means intra-picture prediction and the inter prediction means inter-picture prediction. In the case of the intra mode, the switch 115 may be switched to intra, and in the case of the inter mode, the switch 115 may be switched to inter. The video encoding apparatus 100 may generate a prediction block for an input block of the input pictures and then encode a residual between the input block and the prediction block.

In the case of the intra mode, the intra predictor 120 may perform spatial prediction using pixel values of already encoded blocks adjacent to a current block to generate the prediction block.

In the case of the inter mode, the motion estimator 111 may search a region optimally matched with the input block in a reference picture stored in the reference picture buffer 190 during a motion prediction process to obtain a motion vector. The motion compensator 112 may perform motion compensation using the motion vector to generate the prediction block.

The subtracter 125 may generate a residual block by the residual between the input block and the generated prediction block. The transformer 130 may perform transform on the residual block to output a transform coefficient. Further, the quantizer 140 may quantize the input transform coefficient according to quantization parameters to output a quantized coefficient.

The entropy-encoder 150 may perform entropy-encoding based on values calculated in the quantizer 140 or encoding parameter values, or the like, calculated during the encoding process to output bit streams.

When the entropy-encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the video encoding may be improved through the entropy-encoding. The entropy-encoder 150 may use an encoding method such as exponential golomb, context-adaptive variable length coding (CAVLC), context-adaptive binary arithmetic coding (CABAC), or the like, for the entropy-encoding.

Since the video encoding apparatus according to the exemplary embodiment of FIG. 1 performs inter prediction encoding, that is, inter-picture prediction encoding, a current encoded picture needs to be decoded and stored in order to be used as a reference picture. Therefore, the quantized coefficient is dequantized in the dequantizer 160 and inversely transformed in the inverse transformer 170. The dequantized and inversely transformed coefficient is added to the prediction block through the adder 175, such that a reconstructed block is generated.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The reconstructed block passing through the filter unit 180 may be stored in the reference picture buffer 190.

Figure 2:
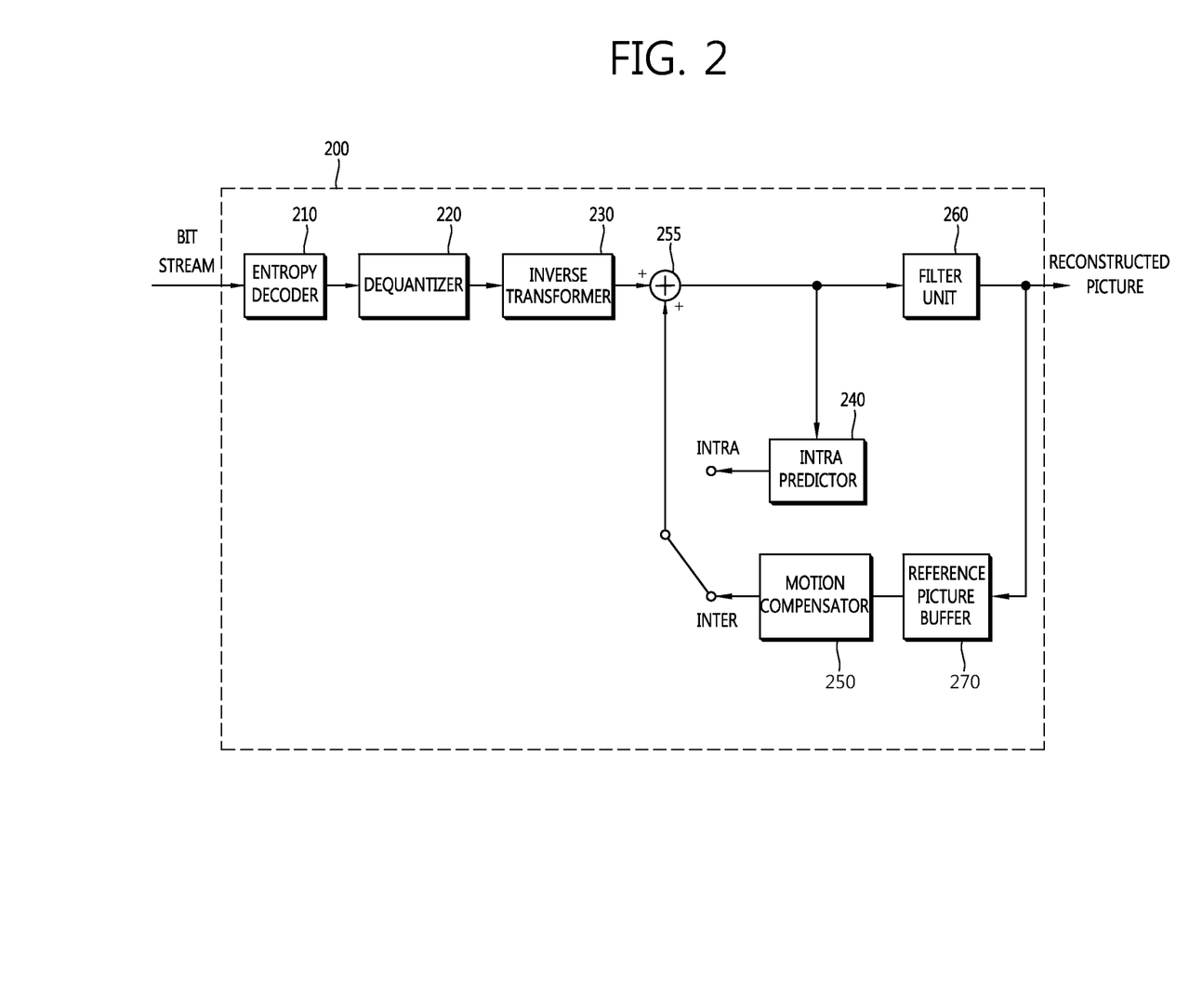
FIG. 2 is a block diagram showing a configuration of a video decoding apparatus according to an exemplary embodiment of the present invention.

FIG. 2 is a block diagram showing a configuration of a video decoding apparatus according to an exemplary embodiment of the present invention.

Referring to FIG. 2, a video decoding apparatus 200 includes an entropy-decoder 210, a dequantizer 220, an inverse transformer 230, an intra predictor 240, a motion compensator 250, an adder 255, a filter unit 260, and a reference picture buffer 270.

The video decoding apparatus 200 may receive the bit streams output from the encoder to perform the decoding in the intra mode or the inter mode and output the reconstructed picture, that is, a recovered picture. In the case of the intra mode, the switch may be switched to the intra, and in the case of the inter mode, the switch may be switched to the inter. The video decoding apparatus 200 may obtain a residual block from the received bit streams, generate the prediction block, and then add the residual block to the prediction block to generate the reconstructed block, that is, the reconstructed block.

The entropy-decoder 210 may entropy-decode the input bit streams according to the probability distribution to generate symbols including a quantized coefficient type of symbols. The entropy-decoding method is similar to the above-mentioned entropy encoding method.

When the entropy-decoding method is applied, symbols are represented by allocating a small number of bits to symbols having high generation probability and allocating a large number of bits to symbols having low generation probability, thereby making it possible to reduce a size of bit streams for each symbol. Therefore, the video decoding compression performance may be improved through the entropy-decoding method.

The quantized coefficients may be dequantized in the dequantizer 220 and be inversely transformed in the inverse transformer 230. The quantized coefficients are dequantized/inversely transformed, such that the residual block may be generated.

In the case of the intra mode, the intra predictor 240 may perform spatial prediction using pixel values of already encoded blocks adjacent to a current block to generate the prediction block. In the case of the inter mode, the motion compensator 250 may perform the motion compensation using the motion vector and the reference picture stored in the reference picture buffer 270 to generate the prediction block.

The residual block and the prediction block may be added to each other through the adder 255 and the added block may pass through the filter unit 260. The filter unit 260 may apply at least one of the deblocking filter, the SAO, and the ALF to the reconstructed block or the reconstructed picture. The filter unit 260 may output the reconstructed picture, that is, a recovered picture. The reconstructed picture may be stored in the reference picture buffer 270 to thereby be used for the inter prediction.

Figure 3:
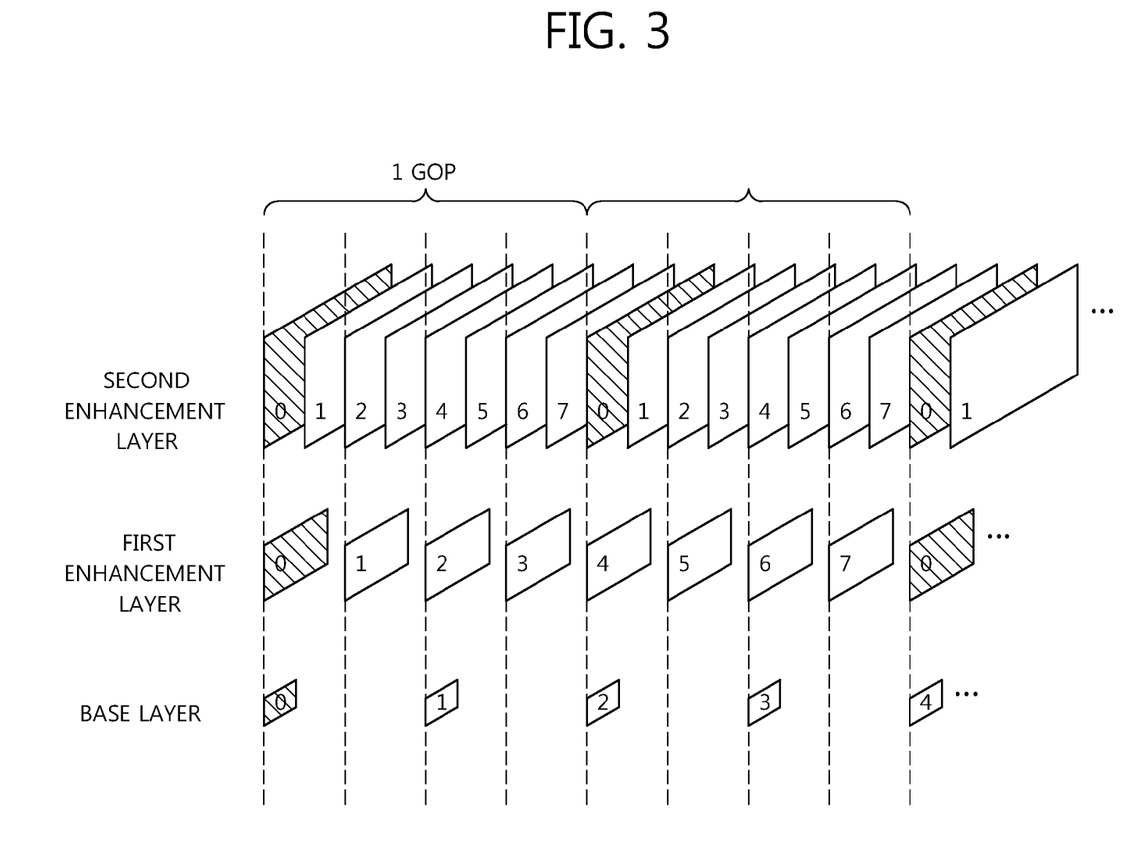
FIG. 3 is a conceptual diagram schematically showing an exemplary embodiment of a scalable video coding structure using multiple layers to which the present invention is applied.

FIG. 3 is a conceptual diagram schematically showing an exemplary embodiment of a scalable video coding structure using multiple layers to which the present invention is applied. In FIG. 3, a group of picture (GOP) represents a picture group.

A transmission medium is required in order to transmit video data, and each of various transmission media has different performances according to network environments. In order to be applied to these various transmission media or network environments, a scalable video coding method may be provided.

The scalable video coding method may be implemented by extension of a general video encoding/decoding method that does not provide scalability. The video encoding apparatus according to the exemplary embodiment of FIG. 1 and the video decoding apparatus according to the exemplary embodiment of FIG. 2 may be a base of the scalable video coding/decoding apparatus. For example, the scalable video coding apparatus may include a plurality of encoders having a form similar to that of the video encoding apparatus according to the exemplary embodiment of FIG. 1. As an example, the scalable video coding apparatus may have a structure in which an encoder having a form similar to that of the video encoding apparatus according to the exemplary embodiment of FIG. 1 is added to the video encoding apparatus according to the exemplary embodiment of FIG. 1. The added video encoder may encode the picture using the bit stream and the reconstructed picture that are generated in the video encoding apparatus according to the exemplary embodiment of FIG. 1 and be operated dependently on the video encoding apparatus according to the exemplary embodiment of FIG. 1 in the scalable video coding apparatus. The scalable video decoding apparatus may include a plurality of decoders having a form similar to that of the video decoding apparatus according to the exemplary embodiment of FIG. 2. As an example, the scalable video decoding apparatus may have a structure in which a video decoder having a form similar to that of the video decoding apparatus according to the exemplary embodiment of FIG. 2 is added to the video decoding apparatus according to the exemplary embodiment of FIG. 2. The added video decoder may decode the picture using the bit streams generated in the video encoding apparatus according to the exemplary embodiment of FIG. 1 and the reconstructed picture generated in the video decoding apparatus according to the exemplary embodiment of FIG. 2 and be operated dependently on the video decoding apparatus according to the to exemplary embodiment of FIG. 2 in the scalable video decoding apparatus.

The scalable video coding method is a coding method of removing inter-layer redundancy using inter-layer texture information, motion information, a residual signal, and the like, to improve encoding/decoding performance. The scalable video coding method may provide various scalabilities in terms of space, time, and picture quality according to ambient conditions such as a transmission bit rate, a transmission error rate, system resources, and the like.

Referring to FIG. 3, the scalable video coding may be performed using a structure of multiple layers so as to provide bit streams that may be applied to various network situations. For example, the scalable video coding structure may include a base layer compressing and processing the picture data using a general video encoding method and an enhancement layer compressing and processing the picture data using both of encoding information of the base layer and the general picture encoding method. Although the scalable video coding structure according to the exemplary embodiment FIG. 3 includes a single base layer and two enhancement layers, the number of layers used in the scalable video coding is not limited thereto, but may be changed according to implementation or as needed.

The structure of multiple layers may include multiple space layers, multiple time layers, multiple picture quality layers, or the like. The pictures included in different space layers may have different spatial resolutions, and pictures included in different time layers may have different temporal resolutions (frame rates). In addition, the pictures included in different picture quality layers may have different picture qualities, for example, different signal-to-noise ratios (SNRs). Therefore, the scalable video coding method may provide spatial, temporal, and picture quality scalabilities. That is, in the scalable video coding method, the video data may be encoded into a single bit stream that may support the spatial, temporal, and picture quality scalabilities. In addition, the above-mentioned spatial, temporal, and picture quality scalabilities may be mixed with each other and then used, and a mixture of at least two of the spatial, temporal, and picture quality scalabilities may be called a combined scalability.

Figure 4:
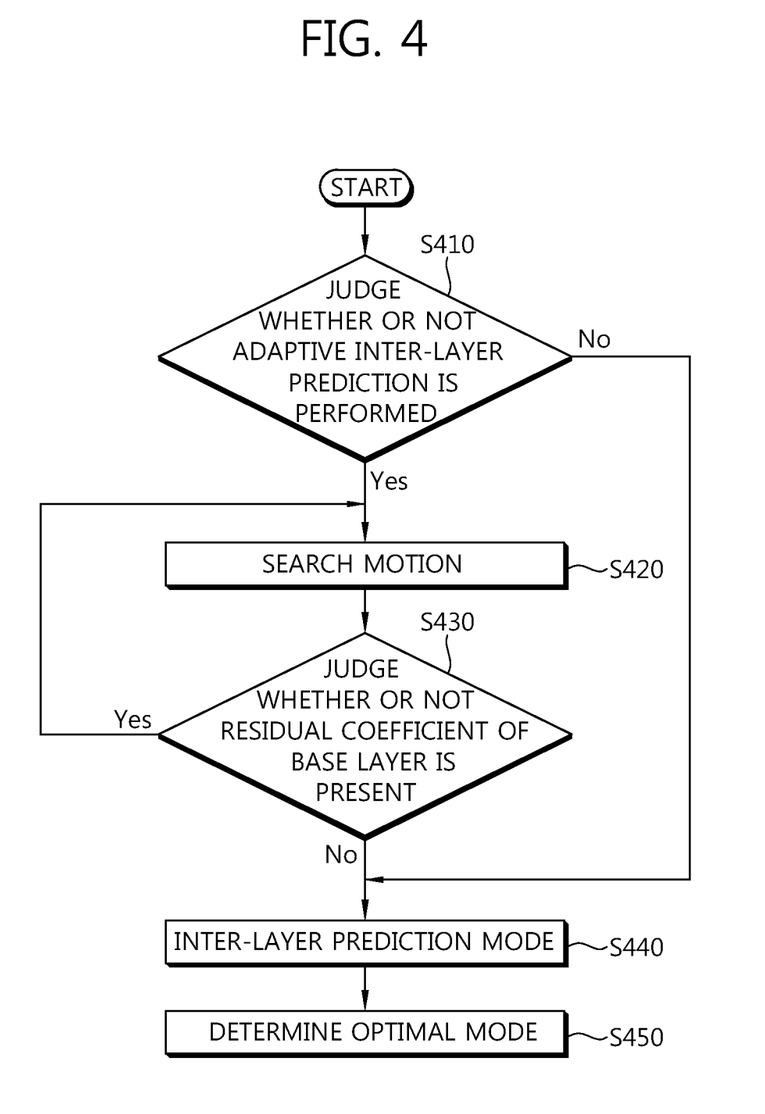
FIG. 4 is a flow chart schematically showing an exemplary embodiment of an adaptive inter-layer prediction method used in the scalable video coding.

FIG. 4 is a flow chart schematically showing an exemplary embodiment of an adaptive inter-layer prediction method used in the scalable video coding. FIG. 4 shows block coding in an enhancement layer.

In the scalable video coding method, an adaptive inter-layer prediction (AILP) technology may be used in order to effectively support the scalability. At the time of adaptive inter-layer prediction, an inter-layer prediction technology and a general motion prediction technology used in a video encoding/decoding method that does not provide the scalability may be used.

In a process of performing the general motion prediction, rate-distortion calculation may be performed based on various prediction modes. Further, in a process of performing the inter-layer prediction, information of a base layer and/or lower layers may be used. As a prediction mode in which the inter-layer prediction is performed, there may be a motion vector prediction mode, a residual data prediction mode, and an intra texture prediction mode.

Referring to FIG. 4, the encoder may judge whether or not adaptive inter-layer prediction is performed (S410).

In the case in which the adaptive inter-layer prediction is performed, the encoding may perform a motion search (S420). The motion search may be performed from a 16×16 mode to a 4×4 mode. Then, the encoder may judge whether or not a residual coefficient of a base layer is present (S430). In the case in which the residual coefficient of the base layer is present, the encoder may again perform the motion search.

In the case in which the adaptive inter-layer prediction is not performed or the residual coefficient of the base layer is not present, the encoder may perform prediction of an inter-layer prediction mode (S440). In this case, in the inter-layer prediction mode, spatial texture prediction using information of the base layer may be performed, and a SKIP mode may be applied.

The encoder may determine an optimal prediction mode through the above-mentioned process (S450).

With the above-mentioned adaptive inter-layer prediction method, encoding efficiency of the SVC may be improved. However, the rate-distortion calculation for the prediction modes of the adaptive inter-layer prediction may cause higher complexity as compared to the video encoding/decoding method that does not use the adaptive inter-layer prediction.

Figure 5:
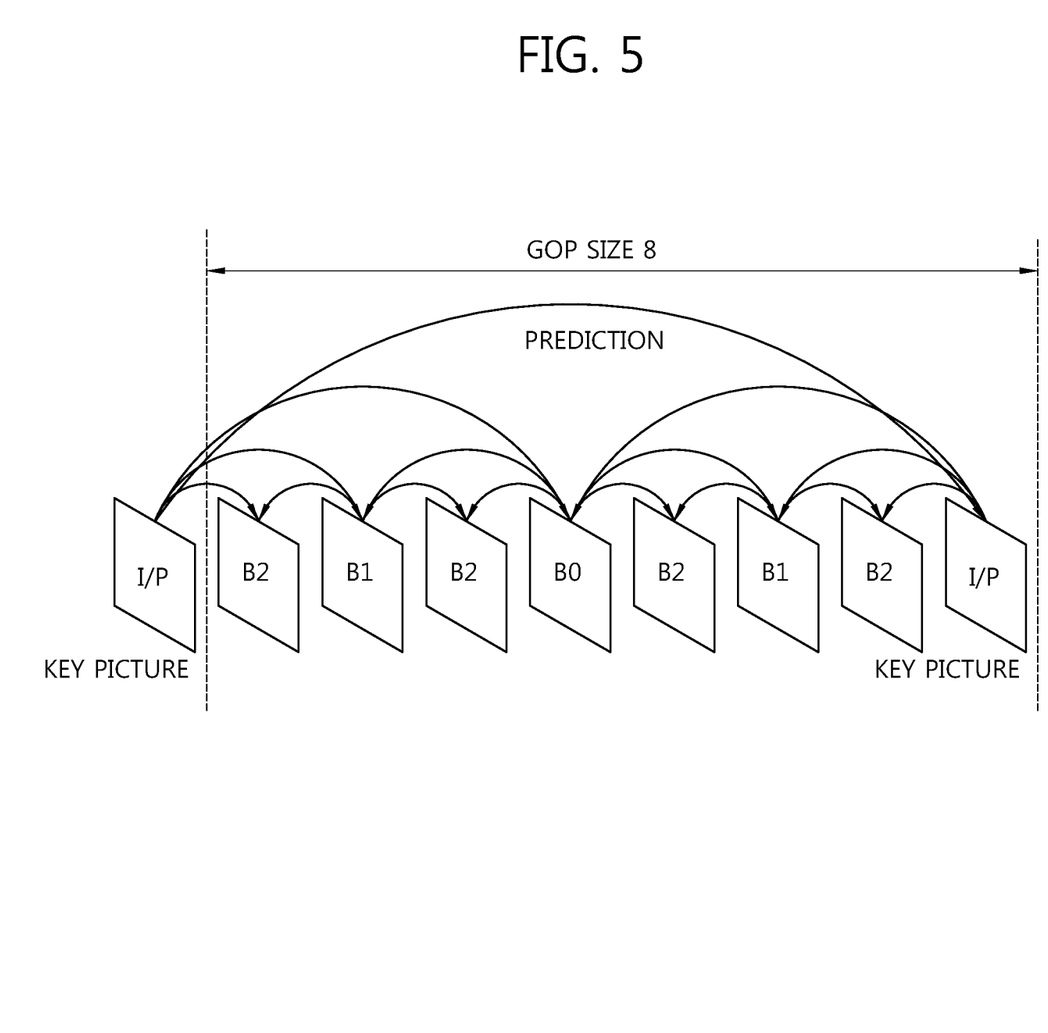
FIG. 5 is a conceptual diagram schematically showing an exemplary embodiment of a bidirectional prediction method in a B picture.

FIG. 5 is a conceptual diagram schematically showing an exemplary embodiment of a bidirectional prediction method in a B picture.

An example of a picture used for picture encoding and decoding may include an I picture, a P picture, a B picture, and the like. The I picture is a picture independently encoded in a frame. The P picture is a picture encoded by inter-frame unidirectional prediction using a single reference picture. The B picture is a picture that may be encoded by inter-frame forward, reverse, or bidirectional prediction using two reference pictures.

The bidirectional prediction in the B picture may be performed with respect to all of the inter modes. Referring to FIG. 5, in the B picture, prediction for a prediction target picture may be performed using both of the past reference picture and the future reference picture. In this case, the encoder and the decoder perform the rate-distortion calculation based on the bidirectional prediction, thereby making it possible to select an optimal prediction block in the reference picture.

With the above-mentioned bidirectional prediction method, the video encoding/decoding efficiency may be improved; however, higher complexity may be caused as compared to the unidirectional prediction.

The adaptive inter-layer prediction technology described above with reference to FIG. 4 and the bidirectional prediction technology described above with reference to FIG. 5 may improve the encoding efficiency, but cause the high complexity. This increase in complexity may make real time encoding difficult. Therefore, a scalable video coding method of reducing the complexity of the scalable video coding structure to enable the real time encoding is demanded.

In order to reduce the complexity of the scalable video coding structure, a mode determining method of enabling rapid mode determination may be considered. An example of a prediction mode of an enhancement layer used in the scalable video coding may include 16×16, 16×8, 8×16, 8×8, 8×4, 4×8, 4×4 block modes, and the like. The encoder may perform motion vector prediction and motion compensation for the 16×16, 16×8, 8×16, 8×8, 8×4, 4×8, 4×4 block modes in order to determine a prediction mode in the enhancement layer. However, in this case, since encoding complexity may increase, a method of determining a mode using coded block pattern (CBP) information may be provided in order to enable rapid mode determination.

Figure 6:
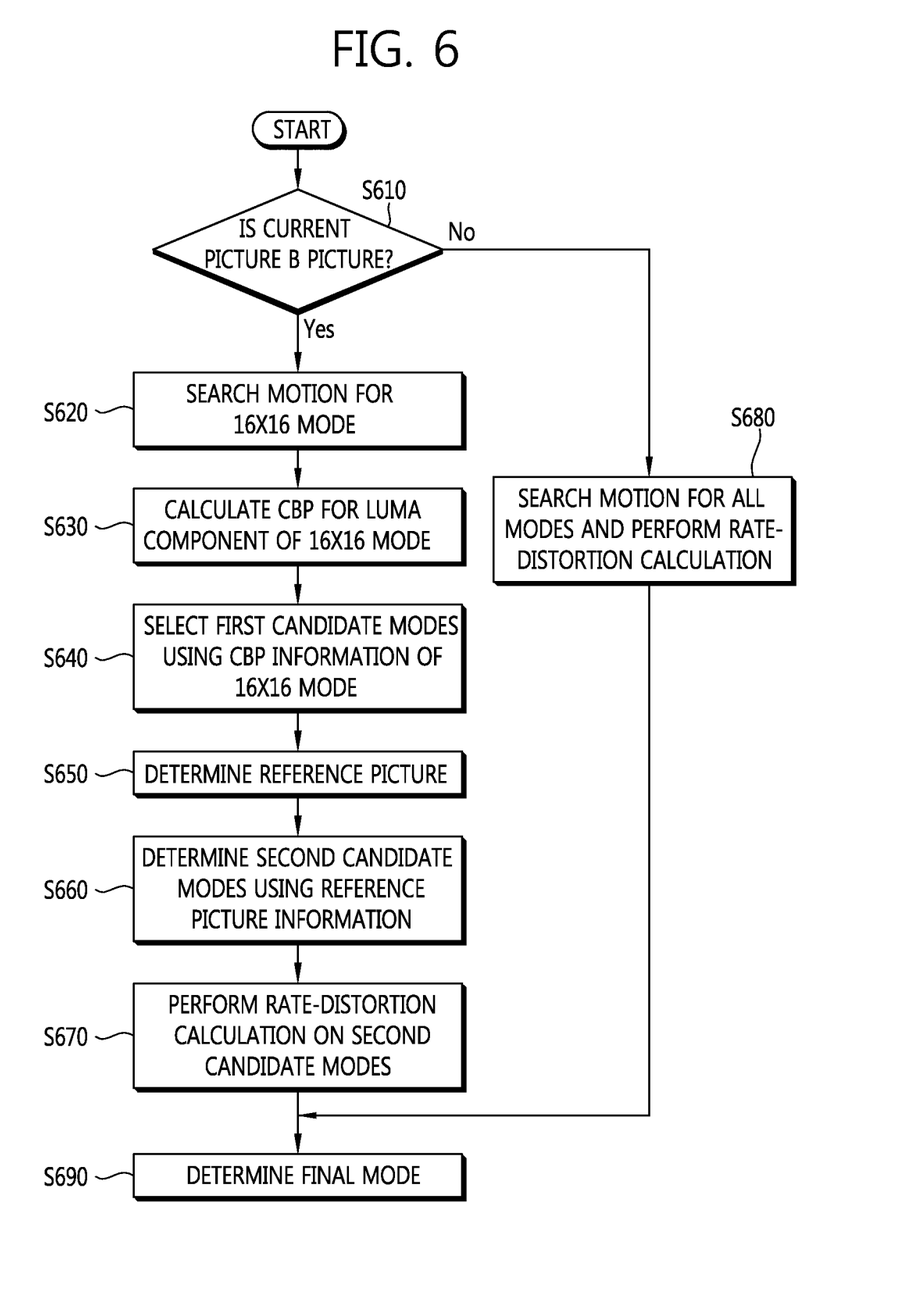
FIG. 6 is a flow chart schematically showing an exemplary embodiment of a mode determining method in the scalable video coding.

FIG. 6 is a flow chart schematically showing an exemplary embodiment of a mode determining method in the scalable video coding. The mode determining method according to the exemplary embodiment of FIG. 6 may be applied to the case of encoding a picture of the enhancement layer. Hereinafter, an encoding target picture in the enhancement layer will be called a current picture. In addition, an encoding target block in the current picture will be called a current block.

Referring to FIG. 6, the encoder may judge whether or not the current picture is the B picture (S610).

In the case in which the current picture is not the B picture, the encoder may perform motion searches for each of the modes from a 16×16 mode to a 1×4 mode and then calculate rate-distortion values (S680). Here, the encoder may determine an optimal mode for the current picture based on the calculated rate-distortion values (S690).

In the case in which the current picture is the B picture, the encoder may perform a motion search for a 16×16 mode of the current picture (S620). After the encoder performs the motion search, the encoder may calculate a coded block pattern (CBP) value for a luma component of the 16×16 mode (S630). Here, the CBP may indicate whether or not it includes a non-zero transform coefficient with respect to each of a luma component block and a chroma component block.

Figure 7:
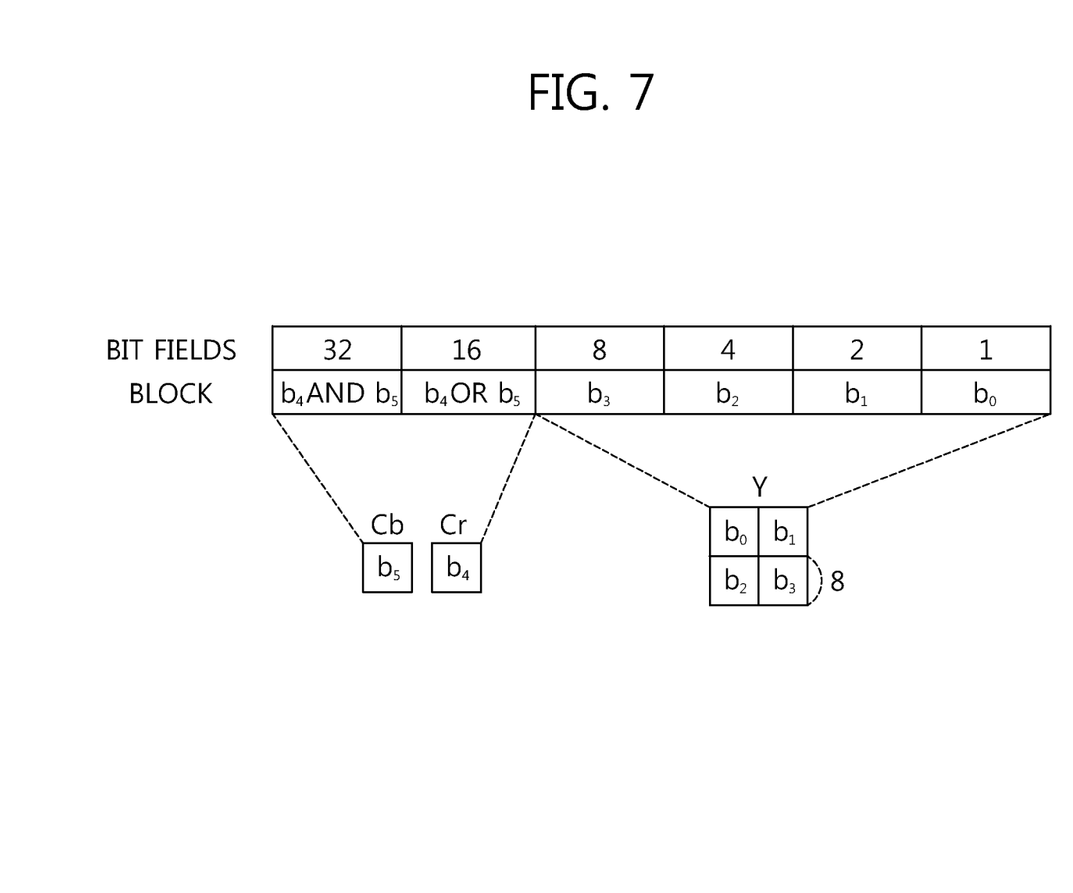
FIG. 7 is a conceptual diagram schematically showing an exemplary embodiment of a bit allocating method for a CBP.

FIG. 7 is a conceptual diagram schematically showing an exemplary embodiment of a bit allocating method for a CBP.

In the exemplary embodiment of FIG. 7, Y indicates a luma component block, and Cb and Cr indicate a chroma component block. In addition, a size of the luma component block may be 16×16, and each of sizes of blocks $b_0$, $b_1$, $b_2$, and $b_3$ in the luma component block may be 8×8. Each of sizes of the chroma component blocks $b_4$ and $b_5$ may be 8×8.

Referring to FIG. 7, each bit field of the CBP may be allocated with a bit value based on an encoded block position. For example, a bit field corresponding to an encoded block, that is, a block that includes a non-zero transform coefficient may be allocated with 1, and a bit field corresponding to a non-encoded block, that is, a block that does not include the non-zero transform coefficient may be allocated with 0. Therefore, the CBP value may represent encoded block patterns with respect to the luma component and the chroma component.

The CPB value for the luma component of the 16×16 mode may be represented by the following Equation 1.

$$CBP_{luma} = b_0 + 2b_1 + 4b_2 + 8b_3 \qquad \text{[Equation 1]}$$

Where $CBP_{luma}$ indicates the CBP value for the luma component of the 16×16 mode.

Again referring to FIG. 6, the encoder may select first candidate modes using the CBP information on the luma component of the 16×16 mode (S640).

The encoder may differently select the first candidate modes according to the value of $CBP_{luma}$. The following Table 1 is a table showing a distribution of an optimal mode finally selected in the case in which the value of $CBP_{luma}$ is 0 in percent (%) unit.

TABLE 1

| Sequence | SKIP&16 × 16 | 16 × 8 | 8 × 16 | SUB8 × 8 |
|---|---|---|---|---|
| Foreman | 87.47 | 4.61 | 5.69 | 2.23 |
| Mobile | 85.98 | 5.13 | 4.82 | 4.07 |
| Football | 83.47 | 7.30 | 6.09 | 3.14 |

In Table 1, Foreman, Mobile, and Football represent a name of a test sequence used in a video encoding/decoding test. Referring to Table 1, in the case in which the value of $CBP_{luma}$ is 0, most of the blocks may be encoded into a large block mode (a SKIP mode, a 16×16 mode).

Therefore, in the case in which the value of $CBP_{luma}$ is 0, the encoder may select the SKIP mode, the 16×8 mode, and the 8×16 mode as the first candidate modes. In this case, a first candidate mode list may be configured of {SKIP, 16×8, 8×16}. In the case in which the value of $CBP_{luma}$ is not 0, the encoder may select a SKIP mode, a 16×8 mode, a 8×16 mode, and a SUB8×8 mode as the first candidate modes. In this case, the first candidate mode list may be configured of {SKIP, 16×8, 8×16, SUB8×8}. Here, in the case of the SUB8×8 mode, a block having a 8×8 size may be further divided into blocks having 8×4, 4×8, 4×4 sizes. Therefore, the SUB8×8 mode may include a 8×8 mode, a 8×4 mode, a 4×8 mode, and a 4×4 mode. Hereinafter, the first candidate mode list {SKIP, 16×8, 8×16} in the case in which the value of $CBP_{luma}$ is 0 will be referred to as a first class, and the first candidate mode list {SKIP, 16×8, 8×16, SUB8×8} in the case in which the value of $CBP_{luma}$ is 1 will be referred to as a second class.

In the above-mentioned first candidate mode selecting method, one of two types of classes may be selected as the first candidate mode list according to the value of $CBP_{luma}$. With the above-mentioned first candidate mode selecting method, the encoder early omits or removes the SUB8×8 mode using the value of $CBP_{luma}$, thereby making it possible to reduce the complexity at the time of encoding.

Again referring to FIG. 6, the encoder may determine a reference picture used to determine second candidate modes (SS650).

The encoder may determine that a picture of a base layer or a picture of a temporal lower level is the reference picture. In this case, the encoder may judge which of the picture of the base layer and the picture of the temporal lower level has information that is the most similar to the current picture. A judgment criterion of the reference picture may be changed according to a layer structure of the scalable video coding.

As an example, it is assumed that the scalable video coding structure is a spatial layer structure or a picture quality layer structure. In this case, the encoder may determine the reference picture based on a difference in quantization parameter between the base layer and the enhancement layer. For example, in the case in which a difference value in quantization parameter is smaller than 4, the encoder may determine that the picture of the base layer is the reference picture. The difference value in quantization parameter may be calculated by the following Equation 2 by way of example.

$$QP_{difference} = |QP_{BL} - QP_{EL}| \quad \text{[Equation 2]}$$

Where $QP_{BL}$ indicates a quantization parameter value of the base layer, and $QP_{EL}$ indicates a quantization parameter value of the enhancement layer. In addition, $QP_{difference}$ difference indicates a difference value in quantization parameter.

In the case in which the difference value in quantization parameter is larger than 4, a temporal distance between the current picture and the picture of the temporal lower level may be calculated.

Figure 8:
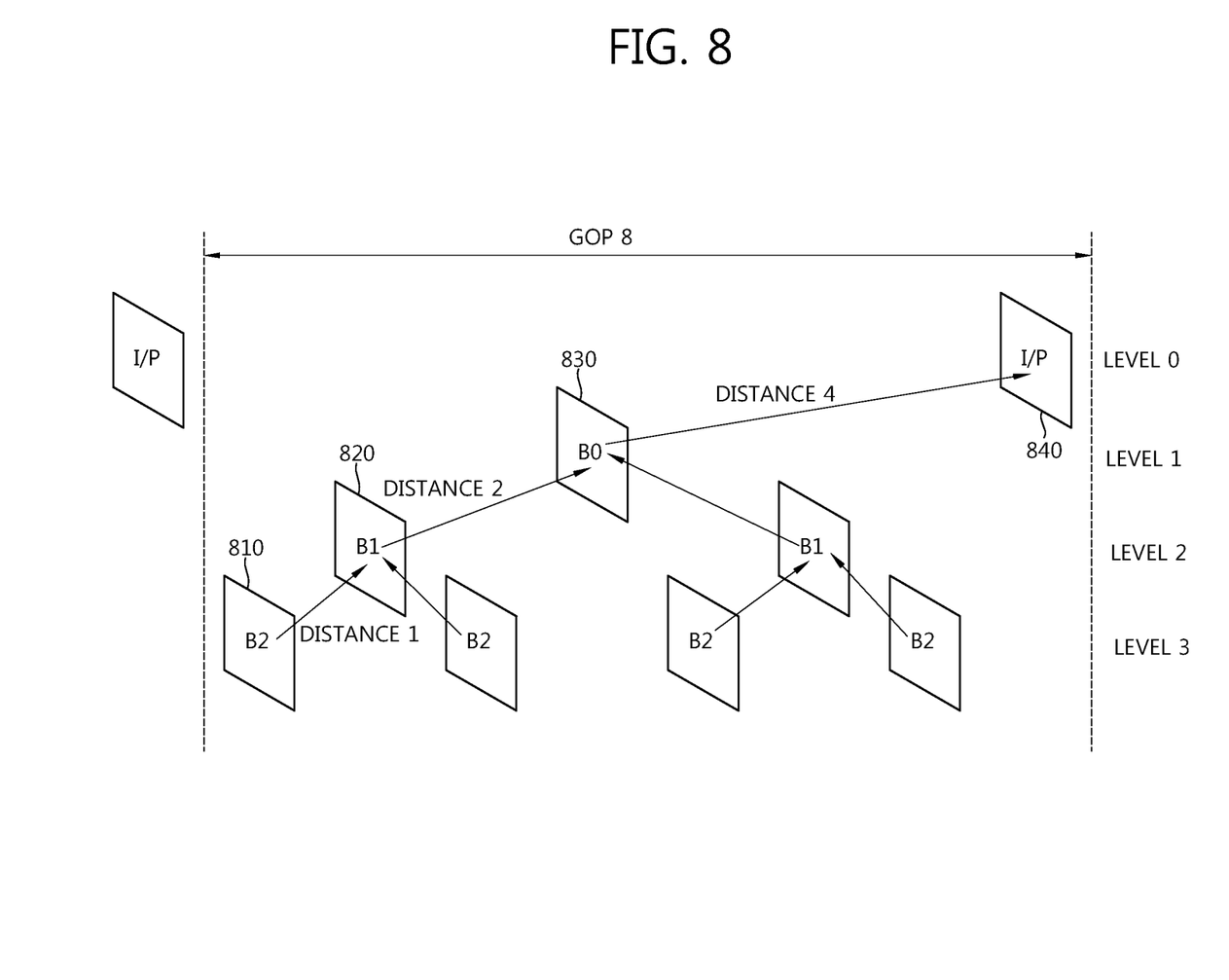
FIG. 8 is a conceptual diagram schematically showing a temporal distance between pictures when a size of group of picture (GOP) is 8.

FIG. 8 is a conceptual diagram schematically showing a temporal distance between pictures when a size of group of picture (GOP) is 8. Referring to FIG. 8, pictures 810, 820, 830, and 840 have different temporal level. Here, a temporal distance between the pictures 810 and 820 may be 1, a temporal distance between the pictures 820 and 830 may be 2, and a temporal distance between the pictures 830 and 840 may be 4.

In the case in which the temporal distance between the current picture and the picture of the temporal lower level is smaller than 3, the encoder may determine that the picture of the temporal lower level is the reference picture. However, in the case in which the temporal distance between the current picture and the picture of the temporal lower level is 3 or more, the encoder may determine that the picture of the base layer is the reference picture.

As another example, it is assumed that the scalable video coding structure is a temporal layer structure. In this case, since the picture of the base layer that may be selected as the reference picture is not present, the encoder may determine that the picture of the temporal lower level is the reference picture.

As still another example, it is assumed that the scalable video coding structure is a combined layer structure. In this case, the encoder may determine that the picture of the base layer or the picture of the temporal lower level is the reference picture.

Figure 9:
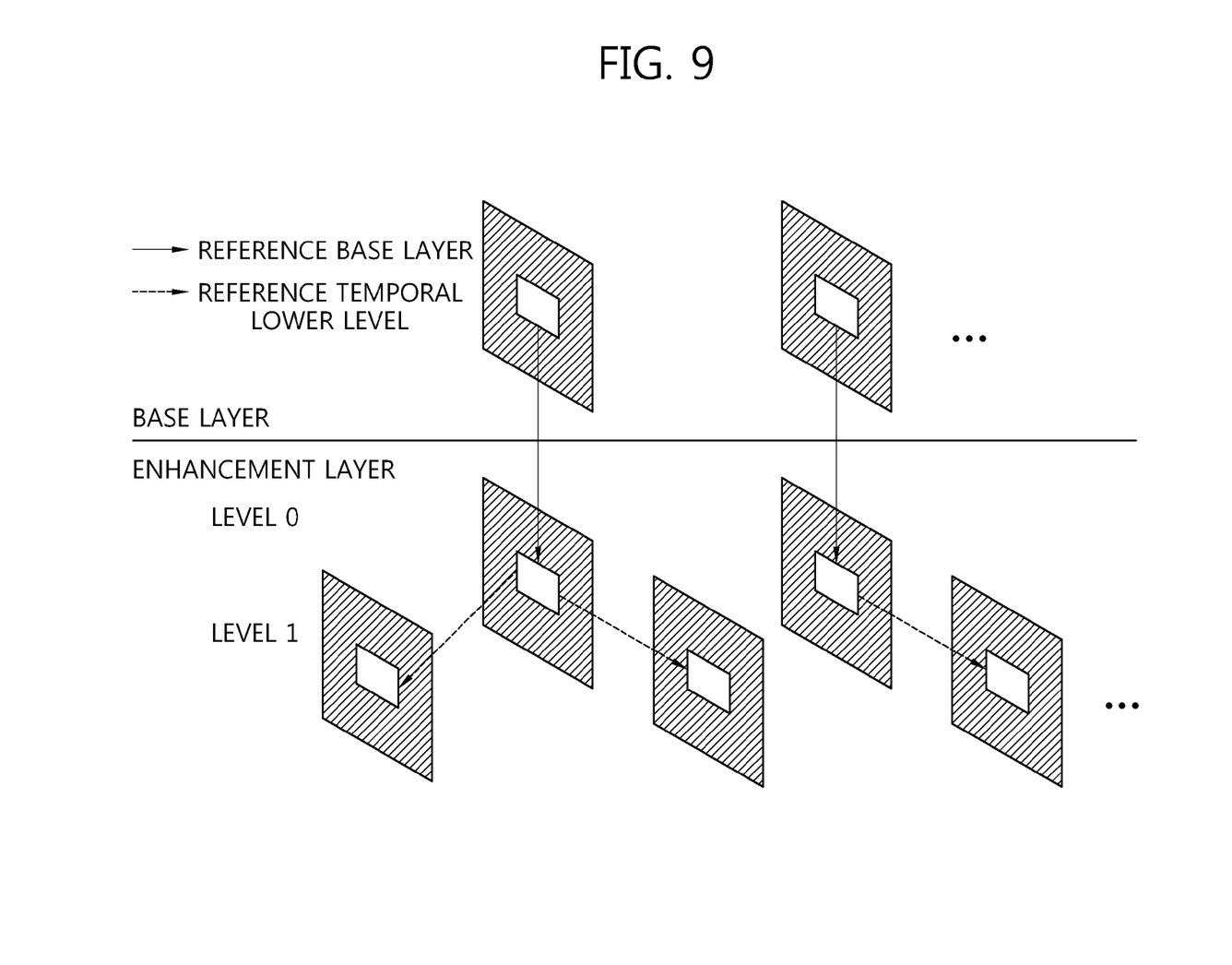
FIG. 9 is a conceptual diagram schematically showing an exemplary embodiment of a reference picture determining method in a combined layer structure.

FIG. 9 is a conceptual diagram schematically showing an exemplary embodiment of a reference picture determining method in a combined layer structure. Referring to FIG. 9, in the combined layer structure, an enhancement layer having a base layer that may be referenced and an enhancement layer not having the base layer that may be referenced may be present. In the case in which the current picture has the base layer that may be referenced, the encoder may determine that the picture of the base layer is the reference picture. In the case in which the current picture does not have the base layer that may be referenced, the encoder may determine that the picture of the temporal lower level is the reference picture.

Again referring to FIG. 6, the encoder may determine second candidate modes using the first candidate mode list and the derived reference picture (S660).

As described above, the first candidate mode list may be classified into first and second classes according to the CBP value for the luma component of the 16×16 mode. Here, the first candidate mode list corresponding to the first class may be {SKIP, 16×8, 8×16}, and the first candidate mode list corresponding to the second class may be {SKIP, 16×8, 8×16, SUB8×8}.

A second candidate mode determining method may be changed according to the layer structure of the scalable video coding. Hereinafter, examples of the second mode determining method according to each layer structure will be described.

As an example, it is assumed that the scalable video coding structure is the spatial layer structure or the picture quality layer structure. In this case, the encoder may determine the second candidate modes using the value of $CBP_{luma}$ of a block corresponding to the current block among blocks in the reference picture. Here, $CBP_{luma}$ indicates the CBP value for the luma component.

Hereinafter, the block corresponding to the current block among the blocks in the reference picture will be referred to as a reference block. Here, the reference block may be the block of the base layer by way of example.

For example, with respect to the first class, in the case in which the value of $CBP_{luma}$ of the reference block is 0 and an optimal mode of the reference block is the SKIP mode or the 16×16 mode, the encoder may determine that the SKIP mode and the 16×16 mode are the second candidate modes. In this case, a second candidate mode list may be configured of {SKIP, 16×16}. In addition, with respect to the second class, in the case in which the value of $CBP_{luma}$ of the reference block is 7, 11, 13, or 14 and an optimal mode of the reference block is the SUB8×8 mode, the encoder may determine that the SKIP mode and the SUB8×8 mode are the second candidate modes. In this case, the second candidate mode list may be configured of {SKIP, SUB8×8}. In the case that does not correspond to the above-mentioned cases, the encoder may determine the optimal mode in the first candidate mode list.

As another example, it is assumed that the scalable video coding structure is the temporal layer structure. In this case, the encoder may determine the second candidate modes using mode information of the reference block.

In the case in which the scalable video coding structure is the temporal layer structure, the reference block used to determine the second candidate modes may mean the block of the temporal lower level. However, in the case in which a temporal distance between the current picture and the picture of the temporal lower level is distant, similarity between the current picture and the picture of the temporal lower level may be low. Therefore, a second mode determining method to be described below may be applied only to the case in which the temporal distance between the current picture and the picture of the temporal lower level is smaller than 3.

For example, in the case in which the first candidate mode list corresponds to the first class and the reference block is encoded in a large block mode (the SKIP mode or the 16×16 mode), the encoder may determine that the SKIP mode and the 16×16 mode are the second candidate modes. In this case, the second candidate mode list may be configured of {SKIP, 16×16}. In addition, the case in which the first candidate mode list corresponds to the second class and the reference block is encoded in a small block mode (the SUB8×8 mode), the encoder may determine that the SKIP mode and the SUB8×8 mode are the second candidate modes. In this case, the second candidate mode list may be configured of {SKIP, SUB8×8}.

As still another example, it is assumed that the scalable video coding structure is the combined layer structure. In this case, the encoder may change the second mode determining method according to whether the reference picture is the picture of the base layer or the picture of the temporal lower level.

As an example, the reference picture may be the picture of the base layer. In this case, when the first candidate mode list corresponds to the first class, the encoder does not separately search the second candidate modes, but may determine that the first candidate modes included in the first candidate mode list are the second candidate modes as they are. In this case, the second candidate mode list may be configured of {SKIP, 16×8, 8×16}. In addition, the case in which the first candidate mode list corresponds to the second class and the value of $CBP_{luma}$ of the reference block 7, 11, 13, or 14, the encoder may determine that the SKIP mode and the SUB8×8 mode are the second candidate modes. In this case, the second candidate mode list may be configured of {SKIP, SUB8×8}.

As another example, the reference picture may be the picture of the temporal lower level. In this case, when the first candidate mode list corresponds to the first class and the value of $CBP_{luma}$ of the reference block is 0, the encoder may determine that the SKIP mode is the second candidate mode. In this case, a second candidate mode list may be configured of {SKIP}. In this case, when the first candidate mode list corresponds to the second class, the encoder does not separately search the second candidate modes, but may determine that the first candidate modes included in the first candidate mode list are the second candidate modes as they are. In this case, the second candidate mode list may be configured of {SKIP, 16×8, 8×16, SUB8×8}.

Again referring to FIG. 6, the encoder may calculate rate-distortion values for each of the second candidate modes included in the second candidate mode list (S670). Then, the encoder may determine that a mode having the smallest rate-distortion value among the second candidate modes included in the second candidate mode list is a final mode for the current block and/or the current picture (S690).

When the final mode is determined, the encoder may perform prediction on the current block based on the determined final mode. In addition, the encoder may encode information on the final mode to transmit the information to the decoder. The decoder may receive and decode the transmitted information on the final mode and perform prediction on the decoding target block using the decoded information on the final mode.

With the above-mentioned mode determining method, the encoder may early determine the candidate modes using the 16×16 mode CPB information of the enhancement layer. In addition, the encoder may efficiently select the reference picture according to each layer structure and/or each kind of scalabilities and efficiently omit the mode using information on the selected reference picture. Therefore, the present invention may enable the rapid mode determination and/or the rapid mode prediction in the scalable video coding and reduce the complexity of the scalable video coding structure. This method of reducing the complexity of the scalable video coder and increasing the speed thereof may also be applied to a real time broadcasting and real time compressing system, or the like.

As set forth above, with the scalable video coding method according to the exemplary embodiment of the present invention, the encoding efficiency may be improved, and the complexity may be reduced.

With the prediction mode determining method according to the exemplary embodiment of the present invention, the encoding efficiency may be improved, and the complexity may be reduced.

In the above-mentioned exemplary system, although the methods have been described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A scalable video coding method based on a structure of multiple layers, comprising:
deriving a coded block pattern (CBP) value of a luma component for a 16.times.16 mode of an encoding target picture;
determining first candidate modes for the encoding target picture according to the derived CBP value;
determining a final prediction mode for the encoding target picture based on the determined first candidate modes; and
encoding the encoding target picture based on the determined final prediction mode, wherein the encoding target picture is a B picture in an enhancement layer,
wherein in the determining of the first candidate modes, the first candidate modes are determined as a first class in the case in which the derived CBP value is 0, and the first candidate modes are determined as a second class in the case in which the derived CBP value is not 0, the first class including a SKIP mode, a 16.times.8 mode, and a 8.times.16 mode, and the second class including a SKIP mode, a 16.times.8 mode, and a 8.times.16 mode, and a SUB8.times.8 mode,
wherein the determining of the final prediction mode includes:
determining a reference picture for the encoding target picture;
determining a second candidate mode (or second candidate modes) for the encoding target picture using information on the determined reference picture; and
determining the final prediction mode among the determined second candidate mode (s), and
wherein the structure of the multiple layers is a spatial layer structure or a picture quality layer structure, and in the determining of the reference picture, the reference picture is determined based on a difference value between a quantization parameter value of a base layer and a quantization parameter value of the enhancement layer.

2. The scalable video coding method of claim 1, wherein in the determining of the reference picture, a picture of the base layer is determined as the reference picture in the case in which the difference value between the quantization parameter value of the base layer and the quantization parameter value of the enhancement layer is smaller than 4.

3. The scalable video coding method of claim 1, wherein the structure of the multiple layers is a spatial layer structure or a picture quality layer structure, and in the determining of the second candidate mode (s), the second candidate mode (s) is (are) determined using a CBP value of a luma component of a reference block, the reference block being a block corresponding to an encoding target block among blocks in the reference picture.

4. The scalable video coding method of claim 3, wherein in the determining of the second candidate mode (s), a SKIP mode and a 16.times.16 mode are determined as the second candidate modes in the case in which the first candidate modes are determined as the first class, the CBP value of the luma component of the reference block is 0, and a prediction mode of the reference block is the SKIP mode or the 16.times.16 mode.

5. The scalable video coding method of claim 3, wherein in the determining of the second candidate mode (s), a SKIP mode and a SUB8.times.8 mode are determined as the second candidate modes in the case in which the first candidate modes are determined as the second class, the CBP value of the luma component of the reference block is 7, 11, 13, or 14, and a prediction mode of the reference block is the SUB8.times.8 mode.

6. The scalable video coding method of claim 1, wherein the determining of the final prediction mode further includes: deriving rate-distortion values for each of the second candidate mode (s); and determining the final prediction mode based on the derived rate-distortion values.

* * * * *